United States Patent
Tocher et al.

(10) Patent No.: US 10,462,344 B2
(45) Date of Patent: Oct. 29, 2019

(54) IMAGING SYSTEM HAVING MULTIPLE IMAGING SENSORS AND AN ASSOCIATED METHOD OF OPERATION

(71) Applicant: NCTech Ltd, Edinburgh (GB)

(72) Inventors: Neil Tocher, Edinburgh (GB); Cameron Ure, Edinburgh (GB); Mansour Ahmadian, Edinburgh (GB)

(73) Assignee: NCTech Ltd, Edinburgh (GB)

( * ) Notice: Subject to any disclaimer, the term of this patent is extended or adjusted under 35 U.S.C. 154(b) by 0 days.

(21) Appl. No.: 15/583,405

(22) Filed: May 1, 2017

(65) Prior Publication Data
US 2017/0339324 A1    Nov. 23, 2017

(30) Foreign Application Priority Data
May 17, 2016  (GB) .................................. 1608667.0

(51) Int. Cl.
    *H04N 5/225*  (2006.01)
    *H04N 5/232*  (2006.01)
    *H04N 13/243* (2018.01)

(52) U.S. Cl.
    CPC ......... *H04N 5/2258* (2013.01); *H04N 5/2329* (2013.01); *H04N 5/23238* (2013.01); *H04N 13/243* (2018.05)

(58) Field of Classification Search
    CPC ............. H04N 5/2258; H04N 5/23238; H04N 13/0242
    See application file for complete search history.

(56) References Cited

U.S. PATENT DOCUMENTS

| | | | | |
|---|---|---|---|---|
| 7,623,177 B2* | 11/2009 | Nakamura | ......... | H04N 5/23293 348/208.11 |
| 8,908,041 B2* | 12/2014 | Stein | .................. | G06K 9/00791 348/148 |

(Continued)

FOREIGN PATENT DOCUMENTS

EP    2764405 A2    8/2014

OTHER PUBLICATIONS

Intellectual Property Office, Search Report for Application No. GB1608667.0, dated Nov. 17, 2016, 4 pages, United Kingdom.

(Continued)

*Primary Examiner* — Tsion B Owens
(74) *Attorney, Agent, or Firm* — Alston & Bird LLP

(57) ABSTRACT

An imaging system having a plurality of imaging sensors, each imaging sensor comprising a plurality of pixels or sensing elements configured to detect incident radiation and output a signal representative thereof. Each imaging sensor is operable to sample different subsets of pixels or sensing elements at different times to collect output signals representative of radiation incident thereon. The imaging system is configured to sample one or more of the subsets of pixels or sensing elements of one or more or each imaging sensor that are towards and/or closest to at least one or each neighboring or adjacent sensor whilst collecting output signals from one or more subsets of pixels or sensing elements of the at least one or each neighboring or adjacent imaging sensor that are towards and/or closest to the imaging sensor. Optionally, the imaging system is configured such that the subsets of pixels or sensing elements of at least one or each imaging sensor are sampled or swept in a pattern that is a mirror image or inverse to that of at least one or each imaging sensor that neighbors or is adjacent to it. For example, at least one or each of the imaging sensors and at least one or each of its neighboring imaging sensors are (Continued)

scanned or swept in directions that are mutually towards and/or away from each other.

12 Claims, 9 Drawing Sheets

(56) References Cited

U.S. PATENT DOCUMENTS

| | | | |
|---|---|---|---|
| 9,204,041 B1 | 12/2015 | Campbell | |
| 10,003,738 B2* | 6/2018 | Lautenbach | H04N 5/23222 |
| 10,051,182 B2* | 8/2018 | Pulli | H04N 5/23264 |
| 2011/0211106 A1* | 9/2011 | Marks | G02B 13/06 |
| | | | 348/340 |
| 2012/0063637 A1* | 3/2012 | Tardif | G06T 11/00 |
| | | | 382/103 |
| 2012/0194712 A1* | 8/2012 | Crook | H04N 5/247 |
| | | | 348/262 |
| 2014/0192213 A1 | 7/2014 | Han et al. | |

OTHER PUBLICATIONS

European Patent Office, Extended European Search Report for Application No. 17168795.7, dated Jun. 16, 2017, 7 pages, Germany.

\* cited by examiner

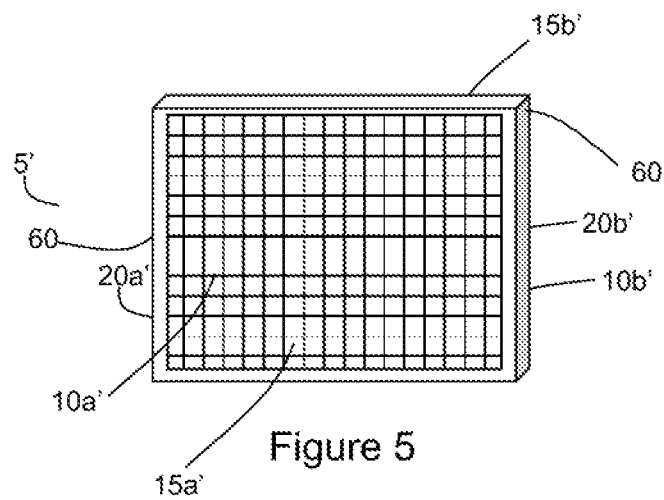
Figure 5
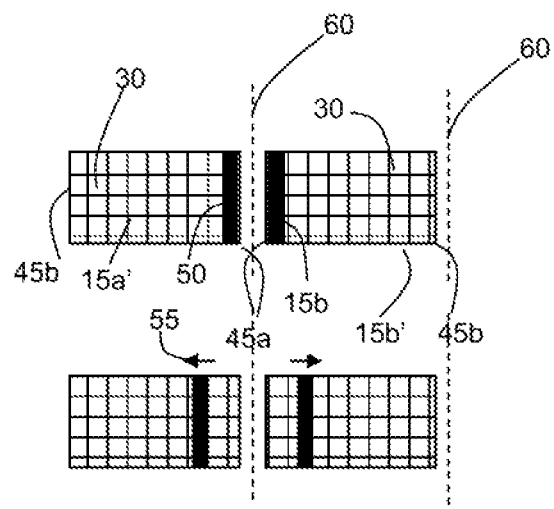
Figure 6A
Figure 6B
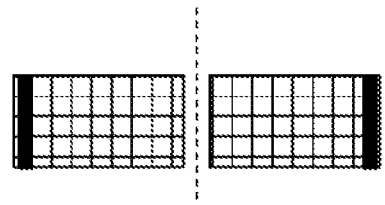
Figure 6C
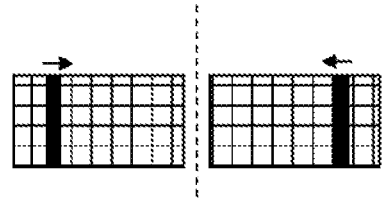
Figure 6D

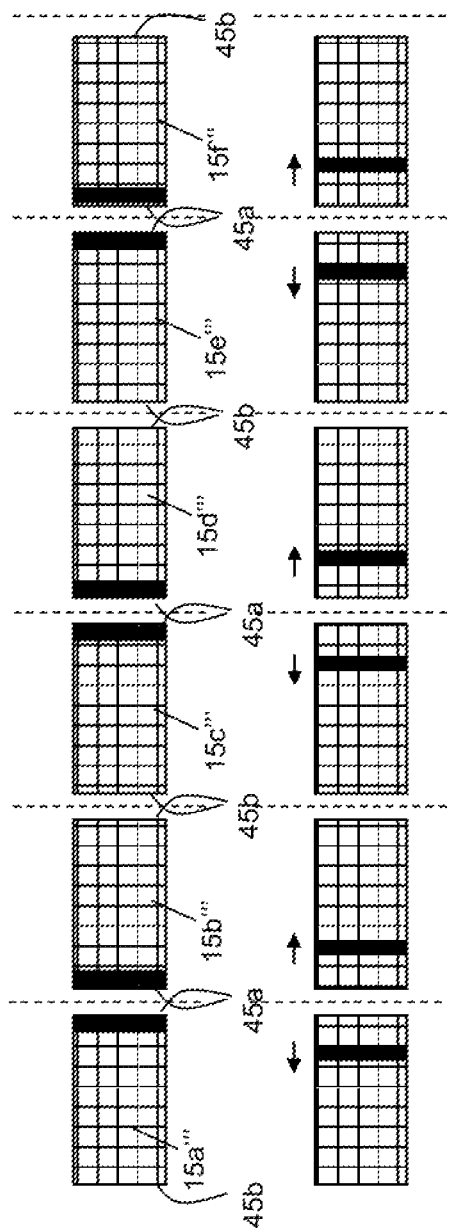

IMAGING SYSTEM HAVING MULTIPLE IMAGING SENSORS AND AN ASSOCIATED METHOD OF OPERATION

CROSS-REFERENCE TO RELATED APPLICATIONS

This application claims priority to and the benefit of United Kingdom Application No. 1608667.0, filed May 17, 2016, the contents of which as are hereby incorporated by reference in their entirety.

BACKGROUND

Technical Field

The present invention relates to an imaging system having a plurality of imaging sensors, such as a panoramic, 360° or 3D camera, and an associated method of collecting imaging data using such as imaging system.

Related Art

Cameras having multiple imaging sensors that face in different directions, that collect images that can subsequently be stitched or combined together to produce a panoramic or 3D image are becoming increasingly popular for a variety of applications such as adding visualisation to mapping typified by Google street view, producing 3D or panoramic images for visualising buildings or architectural work, or for simply taking panoramic and 360° image, amongst others. Examples of such cameras include the iSTAR and Iris360 cameras produced by NCTech Imaging that are capable of producing high quality 360 degree panoramic images that also accurately capture the area above the user taking the photo.

In addition, virtual reality (VR) headsets are increasing in popularity. Although great advances in bringing such VR headsets to the mass market have been made, there remains a significant need for content that is usable with such headsets. Providing suitable high quality but low cost panoramic, 360° or 3D cameras is a key approach in making production of such content more available.

At least one aspect of at least one embodiment of the present invention seeks to mitigate or eliminate at least one problem in the prior art. At least one aspect of at least one embodiment of the present invention seeks to improve the quality of images obtained from imaging systems having multiple imaging sensors for collecting images that are to be stitched or otherwise combined together in a cost effective and easy to produce manner.

BRIEF SUMMARY

According to a first aspect of the present invention there is provided an imaging system comprising a plurality of imaging sensors; each imaging sensor comprising a plurality of pixels or sensing elements configured to detect incident radiation and output a signal representative thereof; and each imaging sensor being operable to sample different subsets of pixels or sensing elements at different times to collect output signals representative of radiation incident thereon.

The imaging system may in certain embodiments comprise an even number of imaging sensors. However, it will be appreciated that the imaging system may comprise an odd number of imaging sensors. The imaging system may be or comprise a camera, such as a panoramic camera, 3D or 360° camera. The imaging sensors may be operable to collect images. The output signals from the pixels or sensing elements may be indicative of parts of an image. The images from the plurality of imaging sensors may be combined or combinable, e.g. by stitching or otherwise combining or compositing together the images produced by the plurality of imaging sensors, into a combined image, such as a panoramic, 3D or 360° image.

The imaging sensors may be arranged such that at least one imaging sensor neighbours or is adjacent at least one other imaging sensor, e.g. two other imaging sensors. At least one or each of the imaging sensors may be provided with an adjacent or neighbouring imaging sensor on one side or two opposite sides of the imaging sensor. At least one or each of the neighbouring or adjacent imaging sensors may be provided on a different surface or face of the imaging system and/or be configured to face or be oriented differently to the imaging sensor. The respective imaging sensors may be provided side to side or top to tail.

The imaging system may be configured to sample one or more of the subsets of pixels or sensing elements of one or more or each imaging sensor that are towards and/or closest to at least one or each neighbouring or adjacent sensor whilst collecting output signals from one or more subsets of pixels or sensing elements of the at least one or each neighbouring or adjacent imaging sensor that are towards and/or closest to the imaging sensor.

At least one or each of the imaging sensors may be a mirror image or inverse of at least one or each of the neighbouring or adjacent imaging sensors. The imaging system may be configured such that the locations of a subset of pixels or sensing elements on neighbouring imaging sensors that are sampled at any given time are mirror images. The imaging system may be configured such that the subsets of pixels or sensing elements of at least one or each imaging sensor are sampled or swept in a pattern that is a mirror image or inverse to that of at least one or each imaging sensor that neighbours or is adjacent to it.

At least two or each imaging sensor may be oriented in the same way and optics such as mirrors used so that the image or optical radiation received by imaging sensors are inverted or mirror imaged compared to at least one or each of the neighbouring or adjacent imaging sensors.

At least one or each of the imaging sensors may be configured to sample different subsets of pixels or sensing elements, which may be sequentially, in turn or in order, e.g. between two opposite sides of the imaging sensor, which may be from one side of the sensor to the other. At least one or each of the imaging sensors may be configured to sample the subsets of pixels or sensing elements as a scan or sweep of the subsets of pixels or sensing elements, e.g. according to a scan or sweep pattern, e.g. between two opposite sides of the imaging sensor, which may be from one side of the sensor to the other.

The imaging system may be oriented or configured to sample the subsets of pixels or sensing elements of at least one or each respective imaging sensor by sweeping, towards and/or away from the at least one or each imaging sensor that neighbours or is adjacent to the respective imaging sensor. The imaging system may be configured such that at least one or each of the imaging sensors and at least one or each of the neighbouring imaging sensors are scanned or swept in directions that are mutually towards and/or away from each other. At least one or each of the respective imaging sensors may be configured scan or sweep towards at least one or each neighbouring or adjacent imaging sensor whilst the neighbouring or adjacent imaging sensor scans or sweeps towards the respective imaging sensor and/or at least one or each of the respective imaging sensors may be configured scan or sweep away from at least one or each neighbouring or adjacent imaging sensor whilst the neighbouring or adjacent imaging sensor scans or sweeps away from the respective imaging sensor.

In other words, adjacent or neighbouring imaging sensors may be configured to sample the subsets of pixels or sensing elements by mutually, synchronously or simultaneously sweeping towards and/or away from each other. In use, a sweep or scan direction for at least one or each of the imaging sensors may be the opposite to the sweep or scan direction of at least one or each of its adjacent or neighbouring imaging sensors, e.g. over at least part or all of a scan or sweep or during at least part or all of an operation of the imaging system.

Each imaging sensor may be configured to sweep or scan the subsets of pixels or sensing elements at substantially the same scan or sweep rate.

The fields of view of subsets of pixels or sensing elements of neighbouring or adjacent imaging sensors that are towards or closest to each other may overlap and/or adjoin or border. In other words, the field of view of at least one or each imaging sensor may partially overlap and/or may adjoin or border with at least one or each of its neighbouring or adjacent imaging sensors, wherein the overlapping, adjoining and/or bordering part of the field of view may be detected by the subset or subsets of pixels or sensing elements of the imaging sensor that are towards or closest to the neighbouring or adjacent imaging sensors.

In the above imaging system, adjacent or neighbouring imaging sensors may have opposite scan or sweep directions such that the adjacent or neighbouring imaging sensors simultaneously mutually sweep or scan towards each other and away from each other. In this way, the subset or subsets of pixels or sensing elements of each respective imaging sensor and each imaging sensor that neighbours or is adjacent to it that are towards or closest to each other are sampled at the same time. As such, the subsets of pixels or sensing elements the each respective imaging sensor and those of its neighbours that image an overlapping area and/or adjoining or bordering areas are sampled at substantially the same time. In this way, synchronisation of the imaging sensors can be achieved in a simple and easy to implement manner. This may also reduce, minimise or eliminate defects in the images.

The imaging sensors may be configured to collect images. A combined image may be formed from a combination of the outputs of each of the subsets of pixels or sensing elements, e.g. collected over at least one sweep or sequential data collection sampling from one side of the grid or array of pixels or sensing elements of the imaging sensor to the other. Optionally, the imaging sensors may be configured to collect an image by performing multiple sweeps or scans and averaging or otherwise combining the collected output data from the pixels or sensing elements.

The subsets of pixels may be distributed over at least one dimension of the respective imaging sensor, e.g. distributed over the width direction or the height direction (or obliquely). The subsets of pixels may comprise one or more rows or columns of pixels.

The imaging sensors may operate according to a rolling shutter or line scan mechanism, e.g. the imaging sensors may be configured to collect an image by collecting data from the subsets of pixels sequentially, e.g. from one side of the imaging sensor to the other, according to a rolling shutter mechanism.

The pixels or sensing elements may be arranged in an array, grid or matrix. The pixels or sensing elements may be arranged in rows and/or columns.

Each subset of pixel elements or sensing elements may comprise a line of pixels or sensing elements, such as a row or column or pixels or sensing elements. Each subset of pixels or sensing elements may comprise a plurality of adjacent or neighbouring or neighbouring pixels or sensing elements. The subset of pixels or sensing element may extend from one edge of the grid or array of pixels or sensing elements to another or opposite edge of the grid or array of pixels or sensing elements (e.g. from top to bottom or from one side to an opposite side). Each subset of pixels or sensing elements may be an exclusive subset. Each pixel or sensing element may exclusively belong to only one subset of pixels or sensing elements, for example, each subset may be or comprise at least one different row or column of pixels or sensing elements.

The imaging system may be configured, for at least one or each of the imaging sensors, to collect output data for each subset of pixels of the respective imaging sensor sequentially, in turn or in order by collecting image data for an adjacent or neighbouring subset of pixels after collecting image data from a preceding subset of pixels. In other words, the imaging sensor may be configured to sequentially sweep, scan or sample each subset of pixels or sensing elements in turn from one edge of the grid or array of pixels or sensing elements to the other.

The imaging system may be configured to generate one or more images from each imaging sensor, wherein corresponding images from corresponding imaging sensors may be generated within an image detection period. The image detection period may correspond to the time taken to sweep, scan or sample each of the subsets of pixels or sensing elements or to perform a selected or predefined number of sweeps, scans or samples of each of the subsets of pixels or sensing elements. The combined image may be formed by combining or stitching together the corresponding images collected from the plurality image sensors during the image detection period.

One or more or each of the imaging sensors may be provided on a different face or surface of a housing to at least one or more or each other or adjacent or neighbouring imaging sensor. One or more or each of the imaging sensors may be oriented differently or face in a different direction to at least one or each other or to at least one or each adjacent or neighbouring imaging sensor. One or more or each of the imaging sensors may face or be oriented perpendicularly or in an opposite direction or obliquely to at least one or each other or to at least one or each adjacent or neighbouring imaging sensor.

The radiation detector may be configured to capture different portions of each image at different times within the associated image period. Each portion of the image may be detected by a differing subset of sensing elements. The detection system may be configured to sample a plurality and in certain embodiments all of the subsets of sensing elements within each image detection period. The detection system may be configured to generate each image by combining the portion of the image generated by each subset of sensing elements within the associated image period in order to form the image. Each subset may be sampled for a predetermined sample time.

At least one or each of the imaging sensors may be or comprise a CMOS photodetector or CMOS photodetector array, an active pixel sensor, a charge coupled device (CCD) or the like. Each pixel or sensing element may comprise a photodiode or a reverse bias p-n junction or the like. At least one or each of the imaging sensors may be or comprise a visible light detector capable of generating an output from incident visible light.

The imaging system or each of the imaging sensors may be, comprise or be comprised in a digital camera.

In certain embodiments each subset of sensing elements may comprise one or more rows or columns of sensing elements. The detection system may be configured to poll, sweep or sample the radiation detector on a row by row or column by column or subset by subset basis.

The rolling shutter or line scan may comprise using at least one or each of the imaging sensors to collect an image by sampling the pixels or sensing elements on a row by row or column by column or subset by subset basis and may comprise generating an image from the respective imaging sensor by combining the output of each sampled row or column or subset of pixels or sensing elements for that imaging sensor.

According to a second aspect of the present invention is a method of collecting image data from an imaging system that comprises a plurality of imaging sensors, wherein each imaging sensor comprising a plurality of pixels or sensing elements configured to detect incident radiation and output a signal representative thereof; and each imaging sensor is operable to sample different subsets of pixels or sensing elements at different times to collect output signals representative of radiation incident thereon.

The imaging system may be or comprise an imaging system according to the first aspect.

The method may comprise sampling one or more of the subsets of pixels or sensing elements of one or more or each imaging sensor that are towards and/or closest to at least one or each neighbouring or adjacent sensor whilst collecting output signals from one or more subsets of pixels or sensing elements of the at least one or each neighbouring or adjacent imaging sensor that are towards and/or closest to the imaging sensor.

The method may comprise sampling a specific or selected subset of pixels or sensing elements of one or more or each of the imaging sensors whilst sampling a subset of pixels or sensing elements of the at least one or each adjacent or neighbouring imaging sensor that is provided on at or on a location, area or position of the at least one adjacent imaging sensor that is a mirror image, inverse, inverted or complimentary to the location, area or position of the specific or selected subset of pixels or sensing elements on the imaging sensor.

The method may comprise sampling different subsets of pixels or sensing elements sequentially, in turn or in order, e.g. between two opposite sides of the imaging sensor, which may be from one side of the sensor to the other. The method may comprise sampling the subsets of pixels or sensing elements as a scan or sweep of the subsets of pixels or sensing elements, e.g. according to a scan or sweep pattern, e.g. between two opposite sides of the imaging sensor, which may be from one side of the sensor to the other.

The method may comprise sampling the subsets of pixels or sensing elements of at least one or each respective imaging sensor by sweeping, towards and/or away from the at least one or each imaging sensor that neighbours or is adjacent to the respective imaging sensor. The method may comprise sweeping, scanning or sampling at least one or each of the imaging systems and at least one or each of the neighbouring imaging systems in directions that are mutually towards and/or away from each other. The method may comprise sampling, scanning or sweeping at least one or each of the respective imaging sensors towards at least one or each neighbouring or adjacent imaging sensor whilst sampling, scanning or sweeping the neighbouring or adjacent imaging sensor towards the respective imaging sensor and/or sampling, scanning or sweeping at least one or each of the respective imaging sensors away from at least one or each neighbouring or adjacent imaging sensor whilst sampling, scanning or sweeping the neighbouring or adjacent imaging sensor away from the respective imaging sensor.

The method may comprise sampling the subsets of pixels or sensing elements of adjacent or neighbouring imaging sensors by mutually, synchronously or simultaneously sampling, sweeping or scanning the subsets of pixels or sensing elements of the adjacent or neighbouring imaging sensors towards and/or away from the respective adjacent or neighbouring imaging sensors. The sweep or scan direction for at least one or each of the imaging sensors may be the opposite to the sweep or scan direction of at least one or each of its adjacent or neighbouring imaging sensors, e.g. over at least part or all of a scan or sweep or during at least part or all of an operation of the imaging system.

The method may comprise sweep or scan the subsets of pixels or sensing elements at substantially the same scan or sweep rate.

According to a third aspect of the present invention is a control unit for controlling an imaging system, such as an imaging system of the first aspect, the control unit comprising a processor and a memory, the memory being configured to store at least part of a computer program, the control unit being coupled or in communication with the plurality of imaging sensors imaging sensors of the imaging system in order to control the plurality of imaging sensors. The control unit may be configured to implement the method of the second aspect.

According to a fourth aspect is a computer program product that when executed by a processing system or control unit, such as a control unit of the third aspect, causes the computer program or control unit to implement the method of the second aspect.

The computer program product may be provided on a carrier medium. The carrier medium may be a tangible, non-transient carrier medium, such as a flash drive, memory stick, optical disk or carrier, magnetic disk or carrier, memory, ROM, RAM, and/or the like. The carrier medium may be, comprise or be comprised in a non-tangible carrier medium such as an electromagnetic wave, electronic or magnetic signal, digital data and/or the like.

It should be understood that the features defined above in accordance with any aspect of the present invention or below in relation to any specific embodiment of the invention may be utilised, either alone or in combination with any other defined feature, in any other aspect or embodiment of the invention. Furthermore, the present invention is intended to cover apparatus configured to perform any feature described herein in relation to a method and/or a method of using or producing or manufacturing any apparatus feature described herein.

BRIEF DESCRIPTION OF THE FIGURES

Various aspects of the invention will now be described by way of example only and with reference to the following drawings, of which:

FIG. 5 shows a panoramic camera having two imaging sensors;

FIGS. 6A-6D are schematic diagrams illustrating the operation of a rolling shutter mechanism for measuring image data using the imaging sensors of the camera of FIG. 5;

FIGS. 9A-9D are schematic diagrams illustrating the operation of a rolling shutter mechanism for measuring image data using the imaging sensors of the camera of FIG. 8;

DETAILED DESCRIPTION OF VARIOUS EMBODIMENTS

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Figure 1:
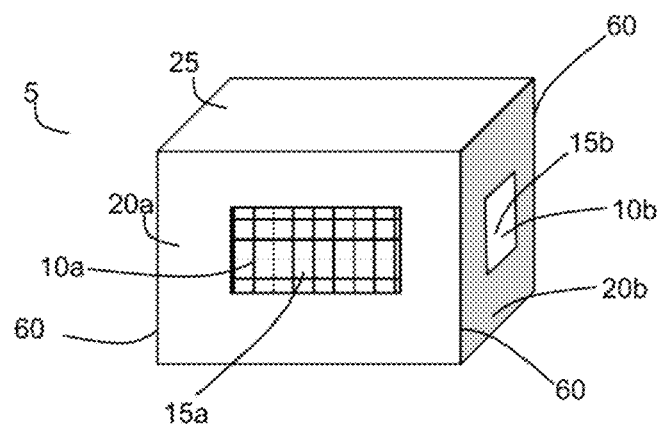
FIG. 1 is a perspective view of a panoramic camera having four imaging sensors.

FIG. 1 shows a panoramic camera 5 having four imaging sensor/lens assemblies 10a-10d, each imaging sensor/lens assembly 10a-10d comprising an imaging sensor 15a, 15b, 15c, 15d and a wide angle lens (not shown for clarity) so that light received by respective wide angle lenses is directed to the associated imaging sensor 15a, 15b, 15c, 15d. Each of the four imaging sensor/lens assemblies 10a-10d is positioned on different external sides 20a-20d of a generally cuboid shaped housing 25. For many applications, four is the optimum number of imaging sensor/lens assemblies 10a-10d (no more or less, i.e. exactly four), as it allows optimum collection of 360° views by the camera 5 without rotation of the camera 5. Each imaging sensor/lens assembly 10a-10d is provided on the different side faces 20a-20d of the camera 5 and is adjacent or neighbouring two other imaging sensor/lens assemblies 10a-10d provided on adjacent or neighbouring side faces 20a-20d of the cuboid housing 25. Each adjacent or neighbouring imaging sensor/lens assembly 10a-10d faces generally 90° to each of its immediately adjacent or neighbouring imaging sensor/lens assemblies 10a-10d in the present example.

Each imaging sensor 15a, 15b, 15c, 15d is operable to collect images and the images collected by the plurality of imaging sensors 15a, 15b, 15c, 15d can be stitched or combined together by a suitable processing device (not shown), which can be on-board or external to the camera 5, e.g. connected via wireless or wired connection, in order to form a combined image such as a panoramic, 3D or 360° view image. The processing may be done in-line and/or in real time or off-line. The panoramic image in certain embodiments covers a full 360° image of the environment around the camera 5 and in certain embodiments also at least the space above the camera 5, e.g. up to the zenith, which may be achieved by appropriately orienting the imaging sensor/lens assemblies 10a-10d, selecting appropriate wide angle lenses and/or other considerations known to a person skilled in the art (such as the arrangements described in European Patent Publication EP2764405 in the name of the present applicant, the contents of which are incorporated by reference in full). At least some or all of the area below the camera 5 may also be included in the panoramic images, but it will be appreciated that full cover below the camera 5 may not be as beneficial if the camera 5 is mounted on a tripod or other stand, as the tripod or other stand may be undesirably present in the lower part of the image.

Each imaging sensor 15a, 15b, 15c, 15d comprises a grid of imaging elements in the form of pixels 30, the pixels 30 being arranged in rows 35 and columns 40. It will be appreciated that the imaging sensors 15a, 15b, 15c, 15d can be based on any suitable imaging sensor technology, such as a CMOS photodetector array, an active pixel sensor, a charge coupled device (CCD) or the like. Depending on the imaging technology used, each pixel 30 may be or comprise a photodiode or a reverse bias p-n junction or the like. Each imaging sensor 15a, 15b, 15c, 15d is configured to collect image data by sampling the pixels 30 on a line by line basis (e.g. row 35 by row 35 or column 40 by column 40). Particularly, in each imaging sensor, each of the lines of pixels 30 of the respective imaging sensor 15a, 15b, 15c, 15d are sampled sequentially from a line of pixels forming one edge 45a of the grid of pixels 30 to a line of pixels forming an opposite edge 45b of the grid of pixels 30 in order to collect an image.

Each imaging sensor 15a, 15b, 15c, 15d is operable to collect images using a rolling shutter. In a conventional technique for using a rolling shutter, rows 35 of pixels are sequentially sampled in order to collect image information a row at a time, the sampling being performed in a sweep a row 35 at a time from the top row of pixels of the imaging sensor to the bottom row 35 of pixels of the imaging sensor. The image is then constructed by combining together the image data collected from each row 35 of pixels 30 in the appropriate relative spatial positions to form the image.

A plurality of conventional rolling shutter imaging sensors using the conventional rolling shutter technique described above can be used in panoramic cameras having a plurality of imaging sensors. In this case, it may be possible to employ timing and synchronisation electronics to synchronise the rolling shutter operation of each imaging sensor. However, the present inventors have found that even when steps are taken to synchronise operation of each of the imaging sensors, artefacts and defects in the panoramic image can arise once the images from each imaging sensor are stitched or combined together. It has been long believed that these defects or artefacts are the result of the stitching or combining algorithms or processes used. However, the present inventors have surprisingly discovered that artefacts and defects can be substantially reduced or eliminated using an easy to implement arrangement of imaging sensors.

In contrast to the above conventional arrangement of rolling shutter imaging sensors, in the camera of FIG. 1, each imaging sensor 15a, 15b, 15c, 15d is arranged so that lines 50 of pixels 30 are sampled sequentially in a sweeping or sampling direction 55 that is towards and away from each adjacent or neighbouring sensor 15a, 15b, 15c, 15d. In this example, the lines of pixels 30 correspond to columns 40 of pixels 30 but this need not be the case, and they could instead correspond to rows 35, diagonals or other straight lines of pixels 30 depending on the construction of the imaging sensor 15a, 15b, 15c, 15d and the relative positioning of a given imaging sensor 15a, 15b, 15c, 15d and the adjacent or neighbouring imaging sensors 15a, 15b, 15c, 15d. In addition, the respective imaging sensors 15a, 15b, 15c, 15d are arranged so that the lines 50 of pixels 30 are sampled in a sweep and/or sequentially from an edge 45a line of pixels 30 that is closest to one of the adjacent or neighbouring imaging sensors 15a, 15b, 15c, 15d, whilst the lines 50 of pixels 30 of the one of the adjacent or neighbouring imaging sensors 15a, 15b, 15c, 15d are sampled in a sweep and/or sequentially from an edge 45b line of pixels 30 that is closest to the respective imaging sensor 15a, 15b, 15c, 15d. In other words, the sweeping and/or sequential sampling of the lines 50 of pixels 30 in each imaging sensor 15a, 15b, 15c, 15d is the mirror image or inverse of the sweeping and/or sequential sampling of the lines 50 of pixels 30 in each imaging sensor 15a, 15b, 15c, 15d neighbouring or adjacent to it.

Figure 2:
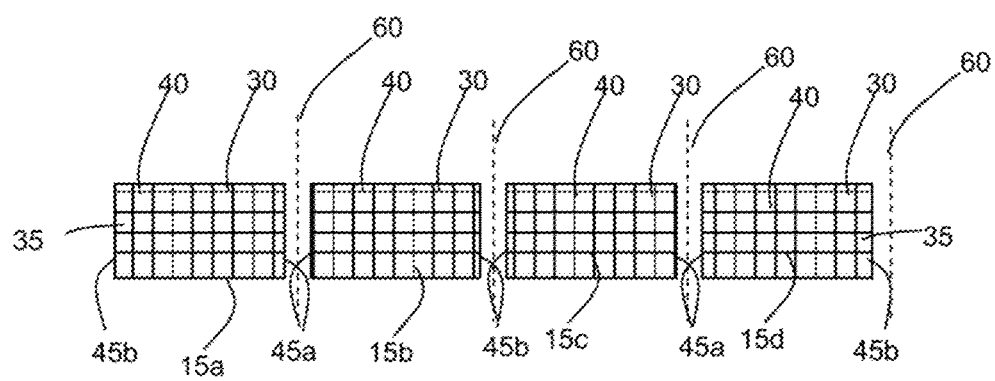
FIG. 2 is a schematic showing the imaging sensors of the camera of FIG. 1 in a pseudo planar view.
Figure 3:
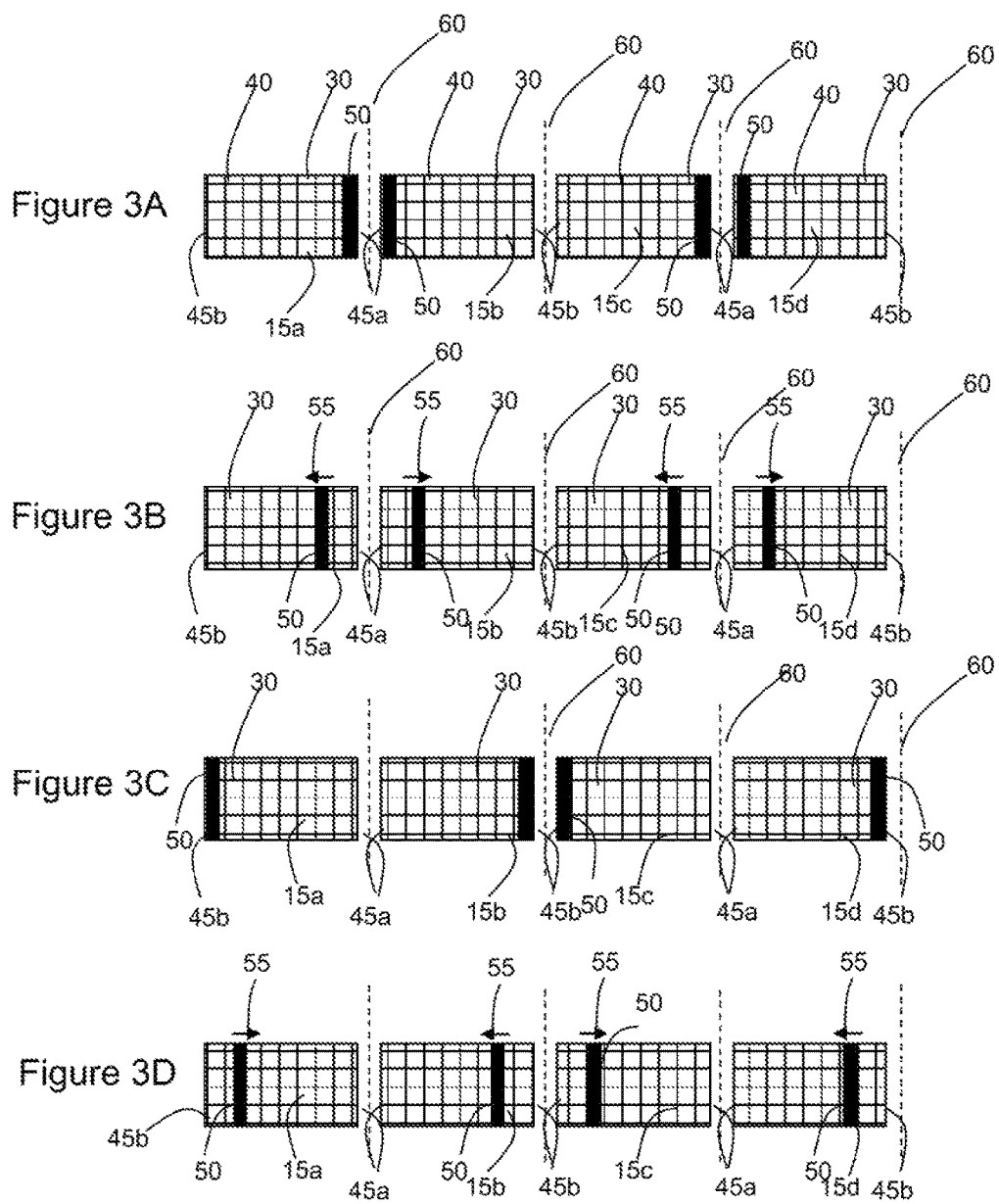
FIGS. 3A-3D are schematic diagrams illustrating the operation of a rolling shutter mechanism for measuring image data using the imaging sensors of the camera of FIG. 1.

FIGS. 2 and 3A-3D illustrate this arrangement for the example of the camera 5 of FIG. 1. In this case, as shown in FIG. 2, the four imaging sensors 15a, 15b, 15c, 15d in the camera of FIG. 1, which are arranged 90° to each of the adjacent or neighbouring imaging sensors 15a, 15b, 15c, 15d by being arranged on adjacent or neighbouring side faces 20a-20d of a cube, are shown in a planar view in which the dashed lines 60 indicate boundaries between faces 20a-20d of the camera 5 (in this case 90° boundaries) for ease of reference and for ease of showing the pixel line 50 being sampled (shown as a blacked out line of pixels) in each imaging sensor 15a, 15b, 15c, 15d at given equivalent points in time. However, it will be appreciated that in the actual camera 5, the imaging sensors 15a, 15b, 15c, 15d each face in different directions as shown in FIG. 1 and are not co-planar.

As shown in FIG. 2, each imaging sensor 15a, 15b, 15c, 15d comprises the grid of pixels 30 in which the pixels 30 are arranged into rows 35 and columns 40. Each imaging sensor 15a, 15b, 15c, 15d is configured to collect images using a rolling shutter. It will be appreciated that, in the example of FIG. 1, each imaging sensor 15a, 15b, 15c, 15d is structurally identical but with each adjacent sensor 15a, 15b, 15c, 15d being rotated 180° relative to its neighbours/ arranged in mirror image such that lines of pixels 30 in any adjacent or neighbouring imaging sensors 15a, 15b, 15c, 15d are mutually sweep sampled towards and away from each other. In other words the sweep sampling of the lines 50 of pixels 30 in each imaging sensor 15a, 15b, 15c, 15d is the mirror image or inverse of that for each imaging sensor 15a, 15b, 15c, 15d that neighbours or is adjacent to it.

Figure 4:
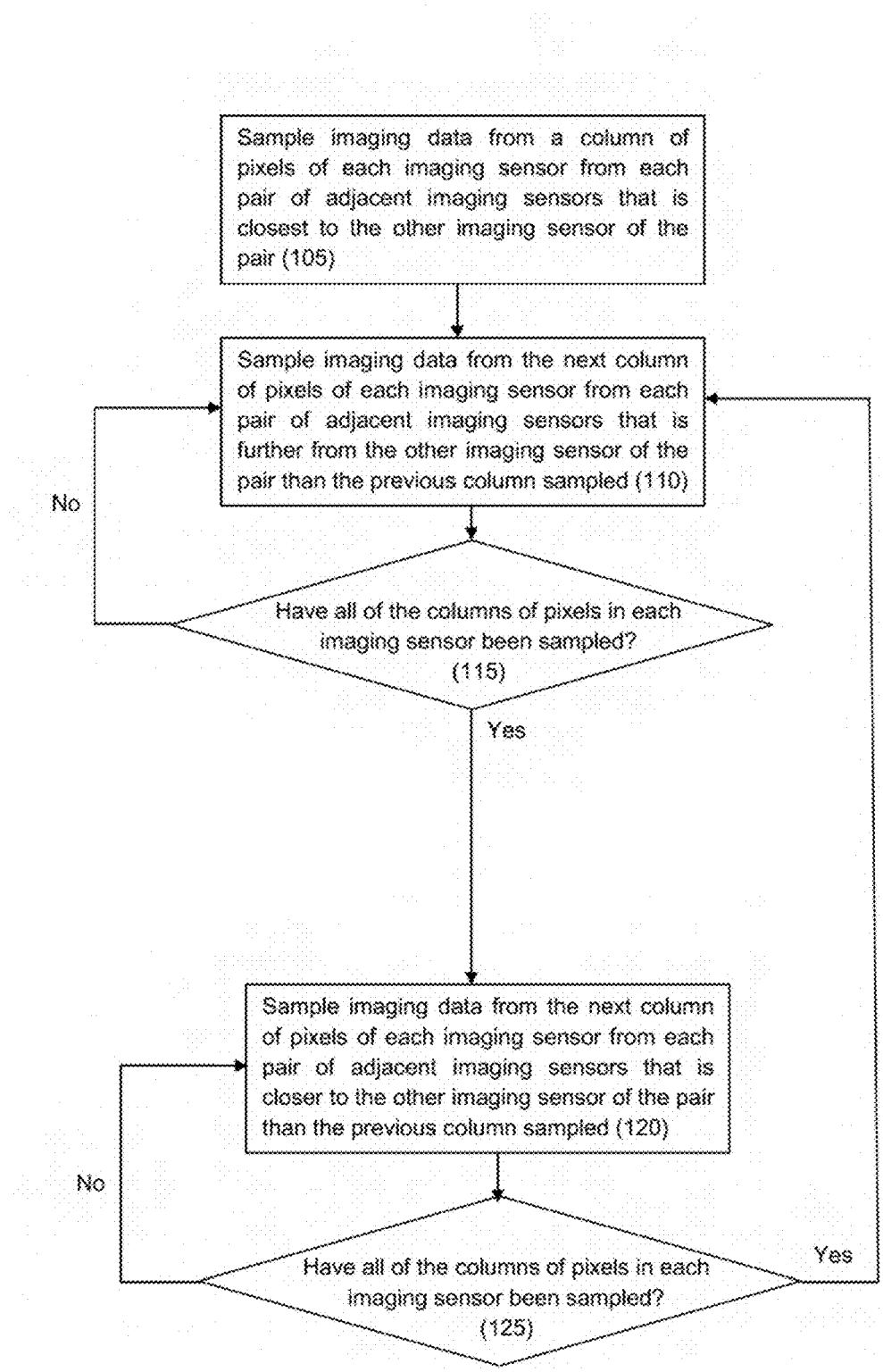
FIG. 4 is a flowchart of a method for collecting imaging data using a panoramic camera, such as that of FIG. 1.

The method of sampling the pixels 30 of each imaging sensor 15a, 15b, 15c, 15d is outlined in the flowchart of FIG. 4 with reference to FIGS. 3A-3D.

In the camera 5, a first imaging sensor 15a is provided in a first face 20a of the camera 5 that borders a second face 20b of the camera 5 in which a second imaging sensor 15b is provided and also borders a fourth face 20d of the camera 5 in which a fourth imaging sensor 15d is provided. The second imaging sensor 15b is provided in the second face 20b of the camera 5 that borders the first face 20a of the camera 5 in which the first imaging sensor 15a is provided and also borders a third face 20c of the camera 5 in which a third imaging sensor 15c is provided. The third imaging sensor 15c is provided in the third face 20c of the camera 5 that borders the second face 20b of the camera 5 in which the second imaging sensor 15b is provided and also borders the fourth face 20d of the camera 5 in which the fourth imaging sensor 15d is provided. The fourth imaging sensor 15d is provided in the fourth face 20d of the camera 5 that borders the third face 20c of the camera 5 in which the third imaging sensor 15c is provided and also borders the first face 20a of the camera 5 in which the first imaging sensor 15a is provided. It will be appreciated that, in the camera 5 of FIG. 1, each face 20a-20d is perpendicular to each adjacent or neighbouring face 20a-20d, i.e. the first face 20a is perpendicular to the second and fourth faces 20b, 20d, the second face 20b is perpendicular to the first and third faces 20a, 20c, the third face 20c is perpendicular to the second and fourth faces 20b, 20d and the fourth face 20d is perpendicular to the third and first faces 20c, 20a.

At a given point in time (step 105), a line 50 (in this case a column 40) of pixels 30 of each respective imaging sensor 15a, 15b, 15c, 15d is sampled that is an edge 45a line of pixels that is closest to one of the adjacent or neighbouring imaging sensors 15a, 15b, 15c, 15d. At substantially the same time, a line 50 (e.g. column 45) of pixels 30 of that adjacent or neighbouring imaging sensor 15a, 15b, 15c, 15d that is closest to the respective imaging sensor 15a, 15b, 15c, 15d is also sampled.

An example of this is shown in FIG. 3A referring to the camera 5 of FIG. 1, in which a column 40 of pixels 30 of the first imaging sensor 15a that is closest to the second imaging sensor 15b (or closest to the corner or junction 60 between the first and second faces 20a, 20b) and furthest from the fourth imaging sensor 15d (or furthest from the corner or junction 60 between the first and fourth faces 20a, 20d) is sampled whilst a column 40 of pixels 30 of the second imaging sensor 15b that is closest to the first imaging sensor 15a (or closest to the corner or junction 60 between the first and second faces 20a, 20b) and furthest from the third imaging sensor 15c (or furthest from the junction 60 between the second and third faces 20b, 20c) is sampled. Substantially concurrently, a column 40 of pixels 30 of the third imaging sensor 15c that is closest to the fourth imaging sensor 15d (or closest to the corner or junction 60 between the third and fourth faces 20c, 20d) and furthest from the second imaging sensor 15b (or furthest from the corner or junction 60 between the second and third faces 20b, 20c) is sampled whilst a column 40 of pixels 30 of the fourth imaging sensor 15d that is closest to the third imaging sensor 15c (or closest to the corner or junction 60 between the third and fourth faces 20c, 20d) and furthest from the first imaging sensor 15a (or furthest from the junction between the first and fourth faces 20a, 20d) is sampled.

Thereafter, in step 110, each other line 50 of pixels 30 is sequentially sampled a line 50 of pixels 30 at a time as part of a sweeping operation by consecutively sampling each line 50 of pixels 30 of each respective imaging sensor 15a, 15b, 15c, 15d until an opposite edge 45b line of pixels 30 is sampled. It will be appreciated that, for each imaging sensor 15a, 15b, 15c, 15d, this involves consecutively sampling lines 50 of pixels 30 in a direction moving away from the edge 45a line of pixels 30 that was sampled in step 105. This involves the sweep sampling lines 50 of pixels 30 for each respective imaging sensor 15a, 15b, 15c, 15d in a direction opposite to the direction of the sweep sampling of lines 50 of pixels 30 for each imaging sensor 15a, 15b, 15c, 15d that is adjacent or neighbouring the respective imaging sensor 15a, 15b, 15c, 15d. As such, it will be appreciated that the pixel line 50 sweep sampling for each imaging sensor 15a, 15b, 15c, 15d is a mirror image or inverse of the pixel line sweep sampling for each imaging sensor 15a, 15b, 15c, 15d that is adjacent or neighbouring to it.

This is illustrated in FIG. 3B referring to the camera 5 of FIG. 1, in which consecutive columns 40 of pixels 30 of the first imaging sensor 15a are sampled in a sweeping direction that moves away from the column 45a of pixels 30 of the first imaging sensor 15a that is closest to the second imaging sensor 15b (or closest to the corner or junction between the first and second faces 20a, 20b) and toward the column 45b of pixels 30 of the first imaging sensor 15a that is closest to the fourth imaging sensor 15b (or closest from the corner or junction between the first and fourth faces 20a, 20b).

Sampling of consecutive columns of pixels of the second imaging sensor comprises a sweep in a direction that is the opposite to the sweep direction in which the consecutive columns of pixels of the first and third imaging sensors are sampled. In this case, consecutive columns of pixels of the second imaging sensor are sampled in a sweeping direction that moves away from the column of pixels 45b of the second imaging sensor 15b that is closest to the first imaging sensor 15a (or closest to the corner or junction 60 between the first and second faces 20a, 20b) and toward the column of pixels 45a of the second imaging sensor 15b that is closest to the third imaging sensor 15c (or closest from the corner or junction between the second and third faces 20b, 20c).

Sampling of consecutive columns 40 of pixels 30 of the third imaging sensor 15c comprises a sweep in a direction 55 that is the opposite to the sweep direction 55 in which the consecutive columns 40 of pixels 55 of the second and fourth imaging sensors 15b, 15d are sampled. In this case, consecutive columns 40 of pixels 30 of the third imaging sensor 15c are sampled in a sweeping direction that moves away from the column 45a of pixels 30 of the third imaging sensor 15c that is closest to the fourth imaging sensor 15d (or closest to the corner or junction 60 between the third and fourth faces 20c, 20d) and toward the column 45b of pixels of the third imaging sensor 15c that is closest to the second imaging sensor 15b (or closest from the corner or junction 60 between the second and third faces 20b, 20c).

Sampling of consecutive columns 40 of pixels 30 of the fourth imaging sensor 15d is swept in a direction 55 that is the opposite to the sweep direction 55 in which the consecutive columns 40 of pixels 30 of the third and first imaging sensors 15c, 15a are sampled. In this case, consecutive columns 40 of pixels 30 of the fourth imaging sensor 15d are sampled in a sweeping direction 55 that moves away from the column 45b of pixels of the fourth imaging sensor 15d that is closest to the third imaging sensor 15c (or closest to the corner or junction 60 between the third and fourth faces 20c, 20d) and toward the column 45a of pixels 30 of the fourth imaging sensor 15d that is closest to the first imaging sensor 15a (or closest from the corner or junction 60 between the fourth and first faces 20d, 20a).

The process of sequentially sampling a line 50 of pixels 30 at a time as part of a sweeping operation is repeated until an opposite edge or end line of pixels 30 has been sampled (step 115).

As shown in FIG. 3C, respective columns 45a, 45b of pixels 30 of the first and fourth imaging sensors 15a, 15d that are closest to the other of the first and fourth imaging sensor 15a, 15d respectively are sampled whilst respective columns 45a, 45b of pixels 30 of the second and third imaging sensors 15b, 15c that are closest to the other of the second and third imaging sensor 15b, 15c respectively are sampled.

Thereafter, in steps 120 to 125, the process of steps 110 to 115 is repeated in reverse, wherein, as shown in FIG. 3D each other column 40 of pixels 30 is sequentially sampled a column 40 of pixels 30 at a time as part of a sweeping operation by consecutively sampling each column 40 of pixels 30 of each respective imaging sensor 15a, 15b, 15c, 15d from a sampling of the edge 45a, 45b shown in FIG. 3C until the other edge 45a, 45b line of pixels 30 is sampled, as shown in FIG. 3A. As can be seen from FIG. 3D, this involves, for each imaging sensor 15a, 15b, 15c, 15d, consecutively sampling lines 50 of pixels 30 in a direction moving away from the edge 45a, 45b line of pixels 30 that was sampled in step 3C. This again involves sweep sampling of lines 50 of pixels 30 for each respective imaging sensor 15a, 15b, 15c, 15d in a direction opposite to the sweep direction 55 for the sampling of the lines 50 of pixels 30 of each imaging sensor 15a, 15b, 15c, 15d that is adjacent or neighbouring to the respective imaging sensor 15a, 15b, 15c, 15d. As such, it will be appreciated that the pixel line sweep sampling for each imaging sensor 15a, 15b, 15c, 15d is a mirror image or inverse of the pixel line sweep sampling for each imaging sensor 15a, 15b, 15c, 15d that is adjacent or neighbouring to it.

The above examples are described in relation to a camera advantageously having four lens/imaging sensor assemblies 10a-10d, wherein each lens/imaging sensor assembly faces 10a-10d in a different direction from side faces of a generally cubic camera 5. However, it will be appreciated that the present invention is not limited to this arrangement and can be applied to other cameras, having different numbers of lens/imaging sensor assemblies and different geometries. In addition, it will be appreciated that the lens/imaging sensor assemblies do not necessarily need to be distributed around the sides of the camera or around a horizontal plane, but could be distributed over the top, sides and/or bottom of the camera or in a vertical plane. Furthermore, the lens/imaging sensor assemblies need not face directly out from the sides of the camera but may be angled relative to the sides of the camera, e.g. angled upwards and/or downwards.

However, it will be appreciated that the general concept described above of providing imaging sensors 15a, 15b, 15c, 15d in which groups of pixels 30, e.g. lines of pixels such as rows 35 or columns 40 of pixels 30, are sequentially sampled in a direction 55 that is towards and away from adjacent or neighbouring imaging sensors 15a, 15b, 15c, 15d and wherein the sampling pattern used for a given imaging sensor 15a, 15b, 15c, 15d is the mirror image of the sampling pattern used for one or more (e.g. in certain embodiments two) adjacent or neighbouring imaging sensors 15a, 15b, 15c, 15d may be applied more generally to other panoramic cameras that have a plurality of imaging sensors and that combine or stitch together images from the plurality of imaging sensors.

Furthermore, although several sweeps of the imaging sensor 15a, 15b, 15c, 15d are described above, e.g. in order to take multiple images, and that the sweeps described sample the imaging sensors in a back and forth motion, it will be appreciated that only a single sweep or a partial sweep may be performed. In addition, the sweep of each individual imaging sensor 15a, 15b, 15c, 15d may take place in only one direction for that imaging sensor 15a, 15b, 15c, 15d, i.e. repeated sweeps may comprise simply repeating the sweeping process shown in FIGS. 3A and 3B and/or described in steps 110 to 115. It will be appreciated that a single sweep from one edge or extreme line 45*a* of pixels 30 to an opposite edge or extreme line 45*b* of pixels 30 may collect one image and that multiple images may be collected by performing multiple edge to edge sweeps.

Some examples of some suitable cameras 5', 5", 5'" are described hereafter. However, it will be appreciated that the present invention is in no way limited to these specific examples and that other variations of cameras that utilise the present invention would be apparent to a person skilled in the art.

For example, a camera 5' having comprising two imaging sensors 15*a'*, 15*b'*, namely a first and second imaging sensor, and corresponding wide angle lenses arranged with each imaging sensor in lens/imaging sensor assemblies 10*a'*, 10*b'* is shown in FIG. 5. In this example, the imaging sensor/lens assemblies 10*a'*, 10*b'* are arranged back to back and face in opposite directions. Each of the imaging sensors 15*a'*, 15*b'* comprise a grid of pixels 30 that are sampled a line 50 of pixels 30 at a time in a rolling shutter arrangement and are substantially identical to the imaging sensors 15*a*, 15*b*, 15*c* and 15*d* described above in relation to FIGS. 1 to 3D. Indeed, the imaging sensors 15*a'*, 15*b'* in the above and below examples advantageously need not be new nor custom imaging sensors but instead could be conventional rolling shutter imaging sensors as many of the key advantages of the present invention result from the orientation, relative arrangement and the manner of operation of a plurality of the imaging sensors rather than the essential hardware of the imaging sensor.

The pattern of sampling the imaging sensors 15*a'*, 15*b'* of the camera of FIG. 5 is shown in FIGS. 6A-6D. In this arrangement, lines 50 of pixels 30 (columns 40 of pixels 30 in this example) of each of the imaging sensors 15*a'*, 15*b'* are sampled (the sampled lines 50 of pixels 30 being shown as darkened out lines) sequentially in a sweeping pattern from one side 45*a*, 45*b* to the other side 45*a*, 45*b* wherein the sweeping direction 55 for any given imaging sensor 15*a'*, 15*b'* at any point in time is the opposite to the sweeping direction 55 of the adjacent or neighbouring imaging sensor 15*a'*, 15*b'*. In other words, at the extreme points of each sweep, edge or extreme lines or columns 45*a*, 45*b* of pixels 30 of each imaging sensor 15*a'*, 15*b'* that are towards or closest to each other are being sampled. In other words whilst the left hand side column 45*b* of pixels when viewed from the front of the first imaging sensor 15*a'* is being sampled, the right hand 45*a* column of pixels 30 when viewed from the front of the second imaging sensor 15*b'* is being sampled, and vice-versa.

In this way, when viewed from the front of each respective imaging sensor 15*a'*, 15*b'*, each imaging sensor 15*a'*, 15*b'* performs sequential sampling of lines 50 of pixels 30 in a manner that is the mirror image of the sequential sampling of lines 50 of pixels 30 for the other imaging sensor 15*a'*, 15*b'*. In this way, the swept sampling patterns of each imaging sensor 15*a'*, 15*b'* substantially "meet" or approach each other at each edge or extreme line/column 45*a*, 45*b* of pixels 30.

When lines 50 of pixels 30 that are at or close to the edges or extremities of the respective imaging sensor 15*a'*, 15*b'* are being sampled, there may be some overlap of the part of the environment around the camera 5' being imaged in the images collected by each sensor 15*a'*, 15*b'*, or at least the portions of the images collected by these lines 45*a*, 45*b* of pixels 30 in adjacent or neighbouring imaging sensor 15*a'*, 15*b'* abut, border or adjoin each other. In this way, each imaging sensor 15*a'*, 15*b'* collects imaging data of a corresponding area of the environment around the camera 5' at substantially the same time as its neighbouring imaging sensor 15*a'*, 15*b'* when lines 45*a*, 45*b* of pixels 30 that are at or close to the edges or extremities of the respective imaging sensor 15*a'*, 15*b'* are being sampled. Although there may be slight variations in timing of the sampling of each of the lines 50 of pixels 30 between imaging sensors 15*a'*, 15*b'* due to synchronisation errors, with the arrangement described herein, the part of the environment being imaged by each imaging sensor 15*a'*, 15*b'* when lines 45*a*, 45*b* of pixels 30 that are at or towards the edges or extremities of the respective imaging sensor 15*a'*, 15*b'* are being sampled are still substantially the same. As a result, the camera 5' is much less sensitive to synchronisation errors in the sampling of the imaging sensors 15*a'*, 15*b'* and defects and artefacts in the stitched together or combined images from the plurality of imaging sensors can be reduced, minimised or eliminated.

Figure 7:
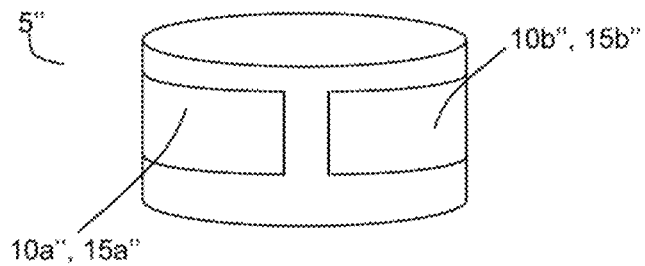
FIG. 7 shows an alternative panoramic camera having two imaging sensors.

Although the cameras 5, 5' shown in FIGS. 1 and 5 have planar imaging sensors 15 provided in planar faces or surfaces 20 of the camera 5, it will be appreciated that this is not essential. For example, as shown in FIG. 7 (which shows a camera 5" with two back to back imaging sensors 15*a"* and 15*b"* only by way of example and is not limited to this), the camera body 25" may be curved or non-faceted and the imaging sensors 15*a"*, 15*b"* may be planar or, if the technology allows, may be curved. However, the modified rolling shutter sampling scheme described above, particularly in relation to FIGS. 6A-6D, applies equally to this arrangement.

Figure 8:
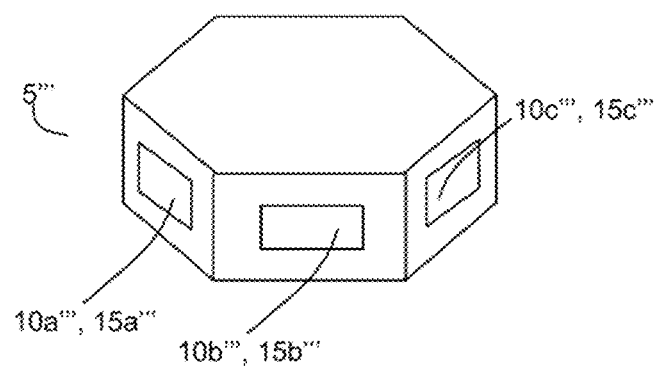
FIG. 8 shows a panoramic camera having six imaging sensors.

In addition, although examples with two and four imaging sensors are described above, other numbers of imaging sensors could be used. For example, FIG. 8 shows a camera 5'" having six imaging sensor/lens assemblies 10*a'"* to 10*f'"* provided in a substantially hexagonal arrangement. An example of a sampling arrangement for this camera 5'" is illustrated in FIGS. 9A-9D. As in the examples given above, the sampling of lines 50 of pixels 30 (e.g. columns of pixels in this example) for each respective imaging sensor 15*a'"* to 15*f'"* comprises a sequential sampling of lines 50 of pixels 30 in a sweeping process from one edge or extremity 45*a*, 45*b* of the array of pixels of the respective imaging sensor to the other edge or extremity of the array of pixels 30 in a direction toward and away from the adjacent or neighbouring imaging sensors 15*a'"* to 15*f'"* and in a sweep direction 55 that is opposite to that of the adjacent or neighbouring imaging sensors 15*a'"* to 15*f'"*, as shown in FIGS. 9A-9D. In this way, it will be appreciated that the pattern of sampling for each imaging sensor 15*a'"* to 15*f'"* is essentially the mirror image of that of each of its neighbouring imaging sensors 15*a'"* to 15*f'"*.

In this way, columns 40 of pixels 30 of each neighbouring imaging sensor 15*a'"* to 15*f'"* that are towards and/or closest to each other are imaged at substantially the same times. In this way, the camera 5'" is less sensitive to synchronisation errors and the stitching together or combining of the corresponding images collected from each of the plurality of imaging sensors 15*a'"* to 15*f'"* results in better combined images and fewer errors and artefacts.

Figure 10A:
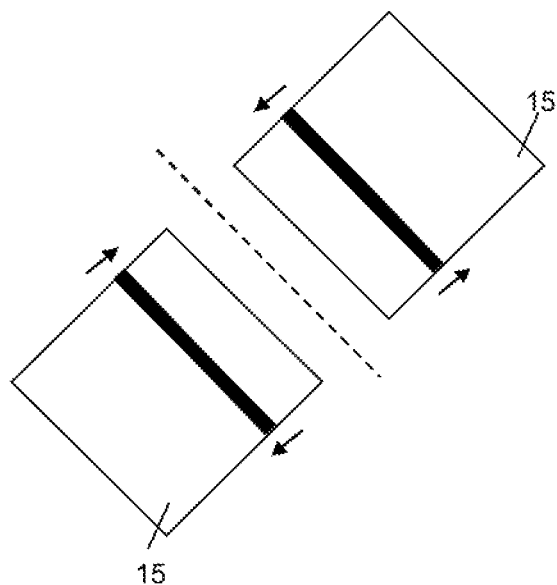
FIGS. 10A-10B show alternative panoramic cameras having two imaging sensors.

In the examples provided above, the imaging sensors 15 are arranged side by side, i.e. the imaging sensors 15 are distributed over the sides of the camera 5, and the rolling shutter samples the array of pixels 30 on a column by column basis. However, it will be appreciated that this arrangement is not essential to implement the above sampling process, and the process could instead by implemented in a camera 5 in which the imaging sensors 15 are distributed over the top, bottom and sides of the camera 5, e.g. the imaging sensors 15 could be arranged in a top to tail arrangement, in which the array of pixels 30 is scanned on a row by row basis. Indeed, the imaging sensors 15 could be distributed over an oblique direction, for example as shown in FIG. 10A in which the lines 50 of the pixel array that are scanned also extend correspondingly obliquely.

Figure 10B:
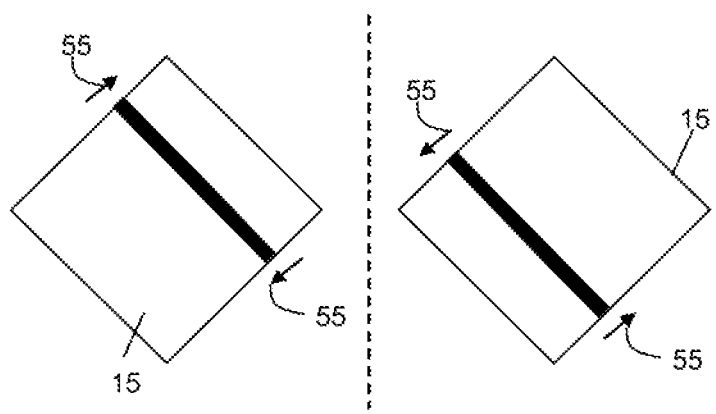

Indeed, the scan or sweep direction 55 for each imaging sensor 15 need not necessarily be directly towards and away from the neighbouring or adjacent imaging sensors 15 but may be obliquely and/or generally towards and away from them, e.g. within 60°, preferably within 45°, and more preferably within 30° or 20° of a direction that is directly towards the neighbouring imaging sensor or between a line through the centres of the neighbouring sensors 15, as shown in FIG. 10B. The present arrangement may provide improvements even in such cameras having obliquely arranged imaging sensors.

Again, as indicated above, the present invention advantageously and in certain embodiments uses conventional off the shelf rolling shutter imaging sensors 15 in a new and beneficial relative arrangement and associated operational scheme. However, it is anticipated that pixelated imaging sensors 15 having new and custom arrangements for sampling the pixels 30 to collect images could be used. In this case, the concept outlined above could be used to provide further advantages. For example, although the imaging sensors described above are all sampled on a line by line basis (e.g. column by column or row by row), it will be appreciated that imaging sensors allowing other sampling arrangements could be used to provide other sampling schemes.

Figure 11A:
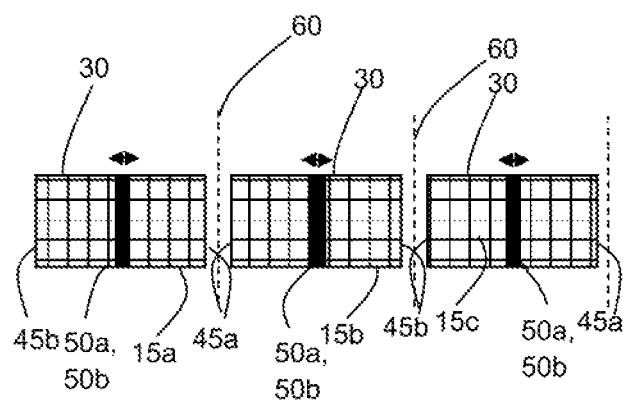
FIGS. 11A-11B are schematic diagrams illustrating the operation of a rolling shutter mechanism for measuring image data using the imaging sensors of a camera having three imaging sensors.
Figure 11B:
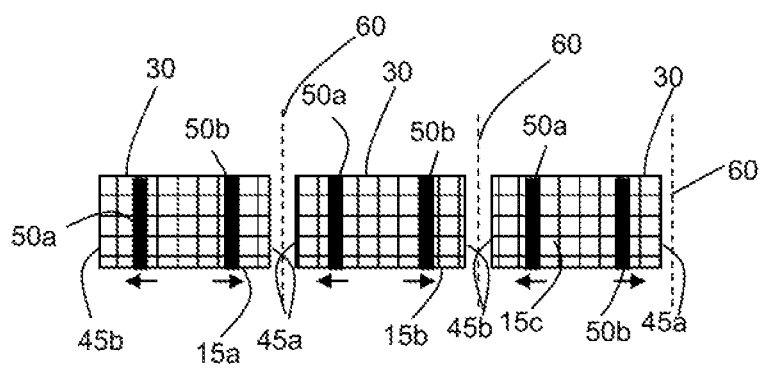

An example of a camera having an odd number of imaging sensors, in this case three imaging sensors 15a, 15b and 15c, is shown in FIGS. 11A-11B. Although FIGS. 11A-11B show the imaging sensors being arranged in a plane, it will be appreciated that the imaging sensors are arranged in a triangular prism arrangement, with the boundaries between side faces of the triangular prism being indicated using dashed lines 60. As such, it will be appreciated that an edge 45b of imaging sensor 15a in FIGS. 11A-11B borders an edge 45a of the imaging sensor 15c.

In this case, columns of pixels 30 of each imaging sensor 15a, 15b, 15c are sampled by simultaneously and synchronously sweeping the columns of pixels 30 in a pattern from a column of pixels in the centre of each respective imaging sensor 15a, 15b, 15c (as shown in FIG. 11A outwardly towards each side edge 45a, 45b of each imaging sensor 15a, 15b, 15c (as shown in FIG. 11B. It will be appreciated that this involves sampling two columns of pixels 50a, 50b simultaneously over some or all of the sweeping motion. One the sampling has reached the side edges of the imaging sensors 15a, 15b, 15c, the sampling is then swept back towards the centre of the respective imaging sensors (i.e. the direction of sweeping motion shown in FIG. 11B is reversed so that the sampling of the columns of pixels 30 seeps back towards the configuration shown in FIG. 11A.

Figure 12A:
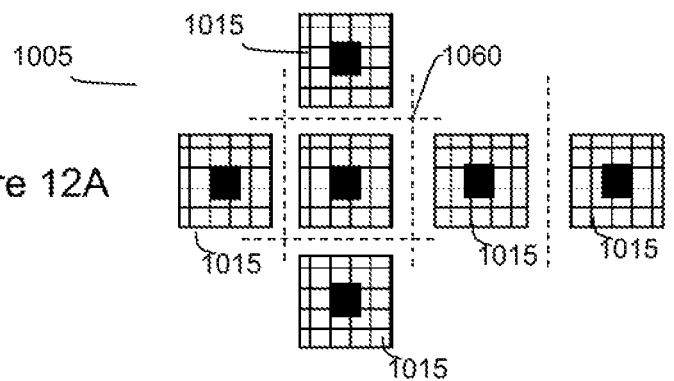
FIGS. 12A-12C are schematic diagrams illustrating the operation of a rolling shutter mechanism for measuring image data using the imaging sensors of a camera having six imaging sensors in a cuboid arrangement.
Figure 12B:
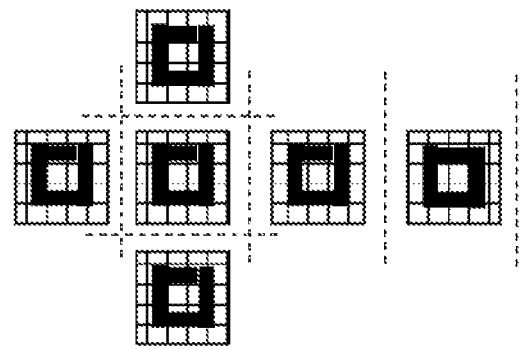
Figure 12C:
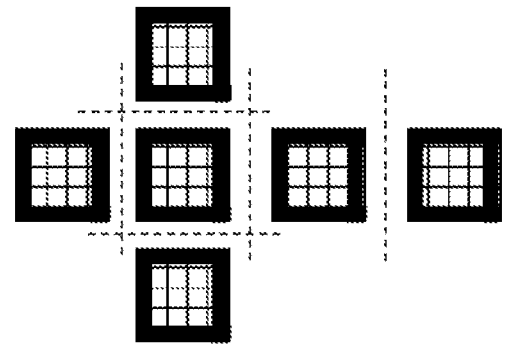

Furthermore, each of the examples above describes imaging sensors 15 distributed in a single plane or around a single direction, e.g. in a side by side/horizontally distributed or a top to bottom / vertically distributed arrangement. However, FIGS. 12A-12C show an example of a camera 1005 in which imaging sensors 1015 are distributed over more than one direction or dimension. In this case, six imaging sensors 1015 are distributed over all six sides of cube, with the junctions 1060 between the cube surfaces indicated in dashed lines and the imaging sensors 1015 shown in a pseudo-planar arrangement for clarity and ease of explanation. However, it will be appreciated that the imaging sensors in the camera 1005 are arranged in a cubic arrangement by essentially folding or bending the surfaces along the dashed lines 1060 indicated in FIGS. 12A-12C.

In the arrangement of FIGS. 12A-12C, each imaging sensor 1015 samples pixels (the sampled pixels being indicated in dark shading) in sweeps from the centre of the imaging sensor 1015 synchronously out towards each of the edges of the imaging sensor, such that neighbouring edges of each imaging sensor 1015 are sampled at substantially the same time, as shown particularly in FIG. 12C.

However, it will be appreciated that the imaging sensors need not fully sync and even a partial sync of the imaging sensors may be beneficial. For example, the imaging sensor arrangements and sweep patterns shown and described in relation to FIGS. 2, 3A-D, and 8 to 11B can be arranged such that imaging axes/field of view of the imaging sensors are provided in three dimensions, such as in a cube embodiment similar to that of FIGS. 12A-12C. In this case, it will be appreciated that at least some of the imaging sensors may be sampled in a pattern that synchronously sweeps towards and away from the sampling sweep pattern of only some but not all of its neighbouring imaging sensors. In this way, conventional off the shelf imaging sensors can be used in an arrangement in which the imaging axes of the imaging sensors are provided in three dimensions but wherein some synchronisation benefits can still be obtained.

Indeed, whilst some of the above arrangements advantageously comprise an even number of imaging sensors 15, 1015 the custom sampling used in the embodiments of FIGS. 11A-11B and 12A-12C could be adapted to provide sampling for non-even numbers of imaging sensors 1015, but configuring the appropriate sampling pattern such that pixels or sensing elements of each imaging sensor 1015 that are at, adjacent or proximate neighbouring or adjacent edges of neighbouring or adjacent imaging sensors 1015 are sampled at substantially the same time.

In view of the above, it will be appreciated that variations of the disclosed arrangements are possible without departing from the invention.

For example, although at least some of the examples above describe sampling an array of pixels or sensing elements on a line by line, particularly a column by column or row by row basis, it will be appreciated that this need not necessarily be the case, and instead the sensing element may be sampled in other arrangements, e.g. at obliquely angled lines or using custom arrangements. Indeed, the sampling need not be by a single line, row or column at a time but the imaging sensors could be sampled in groups of pixels, wherein each group of pixels may comprise a certain pattern of pixels or more than one line, row or column, with one non-limiting example being each group comprising a plurality of lines, rows or columns of pixels. It will also be appreciated that in such instances, the sweep or sampling may be performed on a group by group basis.

Furthermore, whilst certain examples given above describe the imaging sensors being distributed in one direction, e.g. around the side of a camera, and/or the imaging sensors being arranged side by side, it will be appreciated that the imaging sensors could be distributed over other directions or planes or even more than one direction or plane, for example, the imaging sensors could be arranged over top, side and/or bottom surfaces and/or arranged in a top to tail manner and/or may even be distributed over 3 dimensional surfaces.

In addition, the present examples may advantageously use a plurality of off-the shelf rolling shutter sensors in a novel relative arrangement and operating scheme. However, the examples are not limited to this and any imaging sensor that does not use a global shutter could be used.

Furthermore, whilst the cameras described above comprise neighbouring or adjacent imaging sensors that mutually sweep in directions toward and way from each other, it will be appreciated that the sweep direction may be, at least to a limited extent, obliquely towards and away from each other, e.g. with the sweep directions of neighbouring imaging sensors being less than 60°, preferably less than 45°, most preferably being less than 30°, e.g. 20° or less to an imaginary line connecting the centres of the neighbouring or adjacent imaging sensors.

Whilst certain examples given above describe specific shapes of camera, such as cubic, planar, hexagonal, cylindrical and the like, it will be appreciated that the cameras are not limited to these exact shapes, and the camera could be provided in any suitable shape, such as cuboid, polygon, spherical or hemi-spherical, or any suitable curved and/or facetted shape.

Although the examples described above describe visible light sensors for receiving and generating a digital image from visible light, it will be appreciated that the same principle could be used in other sensor types, such as but not limited to IR sensors, UV or other radiation sensors and/or the like.

Furthermore, whilst the imaging sensors are described above as being swept in two opposite directions, e.g. from one side to another side and back again, it will be appreciated that this need not be the case and instead the groups of pixels of the imaging sensors may be sampled or swept in one direction only, e.g. from one side to another before performing the same sampling or sweep again.

Furthermore, it will be appreciated that the camera may comprise a controller and/or comprise, be connected to or be configured to communicate with a processing apparatus for processing the images. The communication may comprise wired or wireless communication. The processing apparatus may be on-board or built in to the camera or remote from the camera, e.g. a server. The controller may comprise a processor and a memory and be configured to control the operation, e.g. the sampling or sweeping of the imaging sensors, and may be configured to receive image data therefrom. The controller may be configured to store the image data, e.g. on the memory or on a further memory, which may be removable, e.g. a memory card or stick, such as an SD card, XD card or some other suitable flash or other memory. The image data collected from each imaging sensor may be forwarded to the processing apparatus to stitch or combine together images and/or imaging data collected by each of the plurality of imaging sensors into combined images, which may be panoramic or 3D images or the like.

As such, the specific embodiments given above are made by way of example only and the scope of the present application is defined by the claims. Indeed, many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An imaging system comprising:
a plurality of imaging sensors,
wherein:
    each imaging sensor comprises a plurality of pixels or sensing elements configured to detect incident radiation and output a signal representative thereof;
    each imaging sensor is operable to sample different subsets of pixels or sensing elements at different times to collect output signals representative of radiation incident thereon;
    the imaging system is configured to sample one or more of the subsets of pixels or sensing elements of one or more or each imaging sensor that are at least one of towards or closest to at least one or each neighboring or adjacent sensor whilst collecting output signals from one or more subsets of pixels or sensing elements of the at least one or each neighboring or adjacent imaging sensor that are at least one of towards or closest to the imaging sensor;
    at least one or each of the imaging sensors is configured to sample the subsets of pixels or sensing elements as a scan or sweep of the subsets of pixels or sensing elements from one side of the imaging sensor to an other side of the imaging sensor; and
    the plurality of imaging sensors are positioned on external non-co-planar surfaces of a single camera such that one or more or each of the imaging sensors is oriented or faces in a different direction to at least one or each other or to at least one or each adjacent or neighboring imaging sensor, the different direction for one or more or each of the imaging sensors being divergent relative to another direction for another one or each of the imaging sensors.

2. The imaging system of claim 1, wherein the imaging system is configured such that the subsets of pixels or sensing elements of at least one or each imaging sensor are sampled or swept in a pattern that is a mirror image or inverse to that of the at least one or each neighboring or adjacent imaging sensor.

3. The imaging system according to claim 1, wherein at least one or each of the imaging sensors and at least one or each of its neighboring imaging sensors are scanned or swept in directions that are mutually at least one of towards or away from each other.

4. The imaging system according to claim 1, wherein each imaging sensor is configured to sweep or scan the subsets of pixels or sensing elements at substantially the same scan or sweep rate.

5. The imaging system according to claim 1, wherein the imaging sensors are configured to collect images and a combined image is formed from a combination of the outputs of each of the subsets of pixels or sensing elements collected over at least one sweep or sequential data collection sampling from one side of the grid or array of pixels or sensing elements of the respective imaging sensor to the other.

6. The imaging system according to claim 1, wherein the subsets of pixels comprise one or more rows or columns of pixels.

7. The imaging system of claim 1, wherein the imaging sensors operate according to a rolling shutter or line scan mechanism.

8. The imaging system according to claim 1 configured, for at least one or each of the imaging sensors, to collect output data for each subset of pixels of the respective imaging sensor sequentially, in turn or in order by collecting image data for an adjacent or neighboring subset of pixels after collecting image data from a preceding subset of pixels.

9. The imaging system according to claim 1, wherein one or more or each of the imaging sensors is provided on a different face or surface of a housing to at least one or more or each other or adjacent or neighboring imaging sensor.

10. A method of collecting image data from an imaging system, the method comprising the steps of:
provinding an imaging system that comprises a plurality of imaging sensors, wherein each imaging sensor comprising a plurality of pixels or sensing elements configured to detect incident radiation and output a signal representative thereof; each imaging sensor is operable to sample different subsets of pixels or sensing elements at different times to collect output signals representative of radiation incident thereon, and the plurality of imaging sensors are positioned on external non-co-planar surfaces of a single camera such that one or more or each of the imaging sensors is oriented or faces in a different direction to at least one or each other or to at least one or each adjacent or neighboring imaging sensor, the different direction for one or more or each of the imaging sensors being divergent relative to another direction for another one or each of the imaging sensors; and sampling one or more of the subsets of pixels or sensing elements of one or more or each imaging sensor that are at least one of towards or closest to at least one or each neighboring or adjacent sensor whilst collecting output signals from one or more subsets of pixels or sensing elements of the at least one or each neighboring or adjacent imaging sensor that are at least one of towards or closest to the imaging sensor, the sampling of the subsets of pixels or sensing elements of the one or each imaging sensor occurring as a scan or sweep of the subsets of pixels or sensing elements from one side of the imaging sensor to an other side of the imaging sensor.

11. A control unit for controlling an imaging system according to claim 1, the control unit comprising a processor and a memory, the memory being configured to store at least part of a computer program, the control unit being coupled or in communication with the plurality of imaging sensors imaging sensors of the imaging system in order to control the plurality of imaging sensors.

12. A computer program product comprising at least one non-transitory computer-readable storage medium having computer-readable program code portions embodied thereon, the computer-readable program code portions comprising one or more executable portions that, when executed by a processing system or control unit, cause implementation of the method of claim 10.

* * * * *